US011610181B2

(12) United States Patent
Andersen et al.

(10) Patent No.: US 11,610,181 B2
(45) Date of Patent: Mar. 21, 2023

(54) TRACEABILITY AND ANALYSIS OF MATERIALS WITHOUT UNIQUE IDENTIFIERS IN MANUFACTURING PROCESSES AND DIGITAL MANUFACTURING TRANSFORMATION

(71) Applicant: ThinkIQ, Inc., Aliso Viejo, CA (US)

(72) Inventors: Niels Andersen, Dana Point, CA (US); Douglas C. Lawson, Silverado, CA (US)

(73) Assignee: ThinkIQ, Inc., Aliso Viejo, CA (US)

( * ) Notice: Subject to any disclaimer, the term of this patent is extended or adjusted under 35 U.S.C. 154(b) by 0 days.

(21) Appl. No.: 17/308,930

(22) Filed: May 5, 2021

(65) Prior Publication Data

US 2021/0350314 A1    Nov. 11, 2021

Related U.S. Application Data

(60) Provisional application No. 63/020,471, filed on May 5, 2020.

(51) Int. Cl.
*G06Q 10/087* (2023.01)
*G06F 16/27* (2019.01)

(52) U.S. Cl.
CPC ........... *G06Q 10/087* (2013.01); *G06F 16/27* (2019.01)

(58) Field of Classification Search
CPC ...... G06Q 10/087; G06Q 10/06; G06F 16/27; G06F 17/40; F04F 1/06
See application file for complete search history.

(56) References Cited

U.S. PATENT DOCUMENTS

| 4,597,507 | A | 7/1986 | Rosenblum et al. |
| 7,379,827 | B1 * | 5/2008 | Roys ..................... G01F 15/063 |
| | | | 702/45 |
| 9,274,022 | B2 * | 3/2016 | Heaton .................. G01M 3/28 |
| 9,291,524 | B2 * | 3/2016 | Fujiwara ................. E02F 9/267 |

(Continued)

FOREIGN PATENT DOCUMENTS

WO    WO 2020/157462 A1    8/2020

OTHER PUBLICATIONS

International Search Report and Written Opinion, Patent Cooperation Treaty Application No. PCT/US2021/030966, dated Aug. 12, 2021, 14 pages.

*Primary Examiner* — Florian M Zeender
*Assistant Examiner* — Vanessa Deligi
(74) *Attorney, Agent, or Firm* — Fenwick & West LLP

(57) ABSTRACT

A system tracks material flow during a production process. In particular, the system receives, from a materials container, a plurality of sensor readings. The materials container comprises a plurality of sensors at one or more intake locations and one or more outlet locations. The system generates an input data set and an output data set from the plurality of sensor readings. The system stores a first electronic ledger entry on an electronic ledger. The first electronic entry comprises the input data set and a time that sensor readings corresponding to the one or more intake locations were taken. The system stores a second electronic ledger entry on the electronic ledger. The second electronic entry comprises the output data set and a time that sensor readings corresponding to the one or more outlet locations were taken. The system generates display data associate with the first and second electronic ledger entries.

13 Claims, 8 Drawing Sheets

(56) References Cited

U.S. PATENT DOCUMENTS

| | | | |
|---|---|---|---|
| 2003/0150909 A1* | 8/2003 | Markham | G06N 5/048 |
| | | | 235/376 |
| 2015/0193595 A1* | 7/2015 | McNamara | A61B 5/0022 |
| | | | 705/2 |
| 2016/0207791 A1* | 7/2016 | Rabe | B03D 1/24 |
| 2017/0348657 A1* | 12/2017 | Mints | E21B 33/13 |
| 2018/0336515 A1 | 11/2018 | Mehring et al. | |
| 2019/0080284 A1 | 3/2019 | Kim et al. | |
| 2019/0121373 A1* | 4/2019 | Panigrahi | G05D 11/133 |
| 2020/0005912 A1* | 1/2020 | Saliman | G16H 10/60 |
| 2020/0184416 A1 | 6/2020 | Javaheri | |
| 2020/0228316 A1* | 7/2020 | Cahill | H04L 9/3297 |

* cited by examiner

TRACEABILITY AND ANALYSIS OF MATERIALS WITHOUT UNIQUE IDENTIFIERS IN MANUFACTURING PROCESSES AND DIGITAL MANUFACTURING TRANSFORMATION

CROSS REFERENCE TO RELATED APPLICATIONS

This nonprovisional application claims a benefit of, and a priority to, Provisional Application No. 63/020,471 entitled "Traceability and Analysis of Materials Without Unique Identifiers in Manufacturing Processes and Digital Manufacturing Transformation," which was filed on May 5, 2020, the contents of which are incorporated by reference herein.

TECHNICAL FIELD

This application generally relates to the field of material transport and material flow analysis with respect to material tracking.

BACKGROUND

Various systems exist in the market today that enable material tracking. For example, boxes may be tracked during shipping using labels attached to each box indicating an identifier (e.g., a serial number) on the box. However, it is not feasible to attach some materials (e.g., liquids, powders, granules, indistinguishable objects) with identifiers, making it difficult to track the materials during a production process. If an error occurs during the production process with such materials (e.g., liquids being heated at the wrong temperature or blended incorrectly), operators may be unable to determine where in the manufacturing process an error occurred due to the lack of labelling.

SUMMARY

Systems and methods for tracking and analyzing non-identifiable items are disclosed herein. Non-identifiable (or non-labelable/non-markable) items include materials that may not be labeled with a unique identifier. Each material may be stored in a materials container before being mixed or otherwise processed in a production process. The materials container is equipment that contains materials during storage or production processes, and the logical representation of a materials container may be referred to as an "account" herein. The terms "stored", "storing", and "storage" refers to any short or long-time containment of the materials inside a materials container. The systems and methods may also generate a record for the production process.

In an embodiment, a system receives, from a materials container, a plurality of sensor readings. The materials container comprises sensors at one or more intake locations and one or more outlet locations. The system generates an input data set and an output data set from the plurality of sensor readings. The system uses algorithms to determine the time and amount of material flow. The system stores a first electronic ledger entry on a material ledger representing an inflow of material to the materials container where the material was stored. The first electronic entry includes the input data set and a time that sensor readings corresponding to the one or more intake locations were taken. The system stores a second electronic ledger entry on the materials ledger representing an outflow of material from the materials container where the material was stored. The second electronic entry includes the output data set and a time that sensor readings corresponding to the one or more outlet locations were taken. The system generates display data associated with the first and second electronic ledger entries and transmits the display data to one or more client devices for display.

The system may also store ledger entries representing transactions (e.g., the movement of material between materials containers). Transactions may occur at valves, conveyors, or other inlet or outlet components, which each move material in a production process. The system may determine locations of materials within the production process by matching electronic ledger entries representing inflows and outflows. In particular, the system may to generate electronic ledger entries that that represent the flow of material from one or more source materials containers (e.g., where the material was stored) to one or more destination materials containers (e.g., where the material is subsequently stored). The system may determine missing information about an amount of material that has been moved out of/off or into materials containers that are not equipped with sensors by matching the sensor readings of inflows with outflows. For instance, the system may, for sensor readings indicating an inflow, determine a time period of that the material flowed into a destination materials container and subsequently determine a how much material flowed into the destination materials container during the time period. If the source materials container that the material flowed out of was not equipped with necessary sensors, the system may determine the amount of material that flowed out based on the inflow into the destination materials container.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

Figure 1:
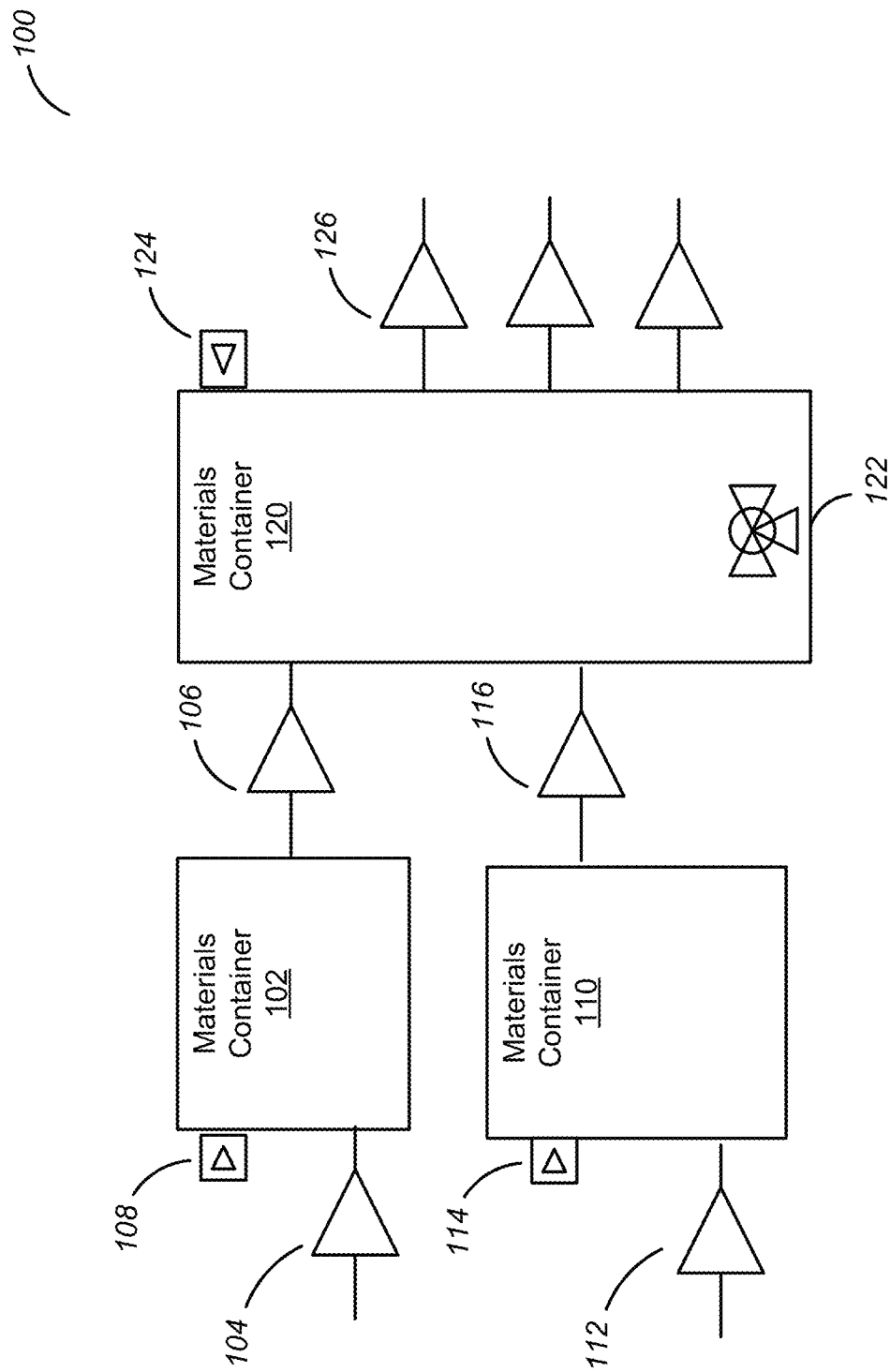
FIG. 1 illustrates a number of materials containers, in accordance with some embodiments of this disclosure.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Various systems may enable material tracking. For example, when a box is shipped, that box may be tracked using a mailing label that is attached to that box. Furthermore, physical objects may be tracked by affixing an identifier (e.g., a serial number) onto the material. For example, when a computer is assembled, the computer is assigned a serial number. That computer may then be identified and tracked using that serial number. Even during a production process (referred to as a manufacturing process herein), this computer may be tracked using the computer's parts, which may also be labeled with identifiers. A record may be created that includes descriptions (e.g., part numbers, serial numbers, etc.) of various components (e.g., computer parts) that are included in the computer. All of the identifiers of those components may be stored in association with the serial number of the computer.

However, tracking materials that are not assigned identifiers is difficult. For example, when a mixture is made that includes a number of liquids, it may be difficult or impossible to affix a serial number onto each element (e.g., liquid) of the mixture before or during the mixing process, thus resulting in such labelling not occurring. Thus, when an issue occurs in the production process, systems may be unable to determine at what point in the production process the issue occurred. For example, if a liquid consumption item is being produced, and the output of that production does not have desired characteristics (e.g., taste, density, or another suitable characteristic), currently available systems are not able to track at what point an issue resulting in the undesirable item occurred. For instance, if there is an issue mixing a first liquid and a second liquid, current systems are not going to be able to identify the issue because neither liquid is tracked, and thus the point in the process where the liquids were mixed is not tracked. Furthermore, it is difficult to track material movements with a fine traceability because of a requirement that every material movement produce a new material identifier (e.g., batch, lot, serial number, or another suitable identifier).

Therefore, systems and methods are disclosed herein for tracing and analyzing non-identifiable items during a manufacturing process. Non-identifiable (meaning unable to be labeled or marked) items include various raw and other materials that make up a material that is not readily or practically able to be labeled or marked with a unique identifier. For example, at a bottling factory, a coloring liquid and a flavoring liquid may be mixed in a process of creating a soft drink. There is no practical way to add serial numbers to these materials, though the embodiments described herein enable a tracking of the coloring liquid and the flavoring liquid during the manufacturing process. In some embodiments, because these materials are not affixed with an identifier (e.g., a serial number), the current disclosure describes a method and system for tracking these materials through materials containers that store these materials and storing the tracking results on an electronic ledger. These materials are mixed or otherwise processed to create a product (e.g., a soft drink). In some embodiments, not only does this approach enable tracing and tracking issues during the production process, but it also enables the system to generate a record for the production process that is unable to be tampered with (e.g., when using a blockchain as an electronic ledger). It should be noted that, in some embodiments, it is preferrable that the system is implemented without using a blockchain as an electronic ledger, but instead by using a database system where entries may be changed.

Moreover, this process enables easy visual traceability from any selected portion of the production process through all traceability data, e.g. sensor data, sample data, configuration data, manufacturing execution system data and enterprise resource planning system data. In addition, this process enables revealing details of components of a material and whether the material is compliant with the intended product specification (e.g., water, sugar, syrup, gluten, and/or other materials in a can of soda beverage) of the product being made. Other benefits include easy data access during product safety recalls and ability to determine quality of raw materials, quality of intermediary goods, quality of finished products, activities, cost, energy intensity, cold chain management, and others.

FIG. 1 illustrates a system 100 of equipment where materials are stored and/or processed, in accordance with some embodiments of this disclosure. Equipment may include material storage, valves and conveyors that move materials between equipment, and a number of sensors that output sensor data from mechanical elements of the equipment performing certain tasks or being set to a certain position during a production process. Sensor data may include physical and/or electrical attributes of the equipment and checkpoints in the process of moving materials (e.g., for a manufacturing process).

The system 100 include a materials container 102 for storing material. The materials container 102 may include one or more valves, which are further described in relation to FIG. 4B. As one example, materials container 102 may include intake valve 104. Though describe in reference to a valve, in some embodiments, intake valve 104 may be another conveyor such as a conveyor belt or combination of pump and one or more valves. Intake valve 104 may generate data based on whether the intake valve 104 is open or closed. For example, intake valve 104 may transmit its status (open or closed) with a specific frequency (e.g., once every second, once every ten seconds, once every minute, or at another suitable frequency). In some embodiments, intake valve 104 may transmit a signal only when the intake valve's position changes. For example, intake valve 104 may transmit a signal indicating when the intake valve 104 has been opened and when the intake valve 104 has been closed. Thus, any system receiving those signals may be required to store the state of the intake valve 104 at specific times. The signal, whether it is being transmitted at a certain frequency or upon change of state, may be a Boolean value indicating True when intake valve 104 is open and indicating False when intake valve 104 is closed. In some embodiments, the signal may be another value. For example, the signal may be a string value indicating an identifier of the intake valve 104, identifier of the materials container 102, and the state of the intake valve 104.

Materials container 102 may also include outlet valve 106. Outlet valve 106 may behave in a similar manner to intake valve 104 and in some embodiments may be another conveyor such as a conveyor belt or pump with multiple valves. That is, outlet valve 106 may transmit its status (e.g., open or closed) at a certain frequency and/or may transmit a signal when the outlet valve 106 is opened or closed. As discussed in relation to intake valve 104, the signal, whether it is being transmitted at a certain frequency or upon change of state, may be a Boolean value indicating True when outlet valve 106 is open and indicating False when outlet valve 106 is closed.

Materials container 102 may also include level sensor (or load cell) 108. The level sensor 108 may indicate how much material is within the materials container 102 and a change in the level (e.g., weight, volume measured as height, or mass measured as weight) can indicate an inflow or outflow of materials. Level of a materials container or account may also be referred to as balance herein. In one example, the level sensor 108 may detect a volume of 100 liters of water in materials container 102. However, after outlet valve 106 was opened for a period of time, the level sensor may determine that materials container 102 only contains 80 liters of water.

Materials container 110 may be a materials container similar to materials container 102. Materials container 110 may include inlet valve 112 (or other conveyor), outlet valve 116 (or other conveyor), and level sensor 114. Each of these components may behave in the same manner as the corresponding components of materials container 102. When outlet valve 106 and outlet valve 116 are open, materials from materials container 102 and materials container 110, respectively, flow into materials container 120. In some embodiments, outlet valve 106 and outlet valve 116 may enable different rates of flow. For example, outlet valve 106 may enable more material to flow per a given time interval than outlet valve 116. Thus, in some embodiments, each outlet valve (and inlet valve) may transmit a flow volume value or a percentage open value indicating whether the outlet valve is fully open or partially open.

Materials container 120 may be a mixing container. That is, materials container 120 may include mixing mechanism 122, which may be referred to as an agitator for materials within materials container 120. Mixing mechanism 122 may mix various materials, such as liquids, gasses, bulk particulate solids, or a combination, within the materials container 120. Mixing mechanism 122 may also transmit a signal indicating whether the mixing mechanism 122 is operating (e.g., mixing) or not operating (e.g., not mixing). Materials container 120 may include level sensor 124 that outputs data that is similar to the data of level sensors 108 and 114, but the data output is for materials container 120. Materials container 120 may also include outlet valves 126 that may enable the material in materials container 120 to flow out. Those materials may flow out to another materials container to be further mixed or packaged into, for example, bottles.

In some embodiments, materials containers of the system 100 may include other types of sensors (e.g., pressure sensors, temperature sensors, weight sensors, mass sensors, energy sensors, viscosity sensors, electrical sensors, density sensors, load sensors, flow meters, and other suitable sensors at each materials container). The sensors may output sensor data describing one or more properties that the sensors measure (e.g., a pressure sensor outputs electrical signals representative of the pressure in the materials container) and timestamps associated with the sensor data. Output values of the sensors may be Boolean, integer, floating point, string, and/or other suitable values.

Figure 2:
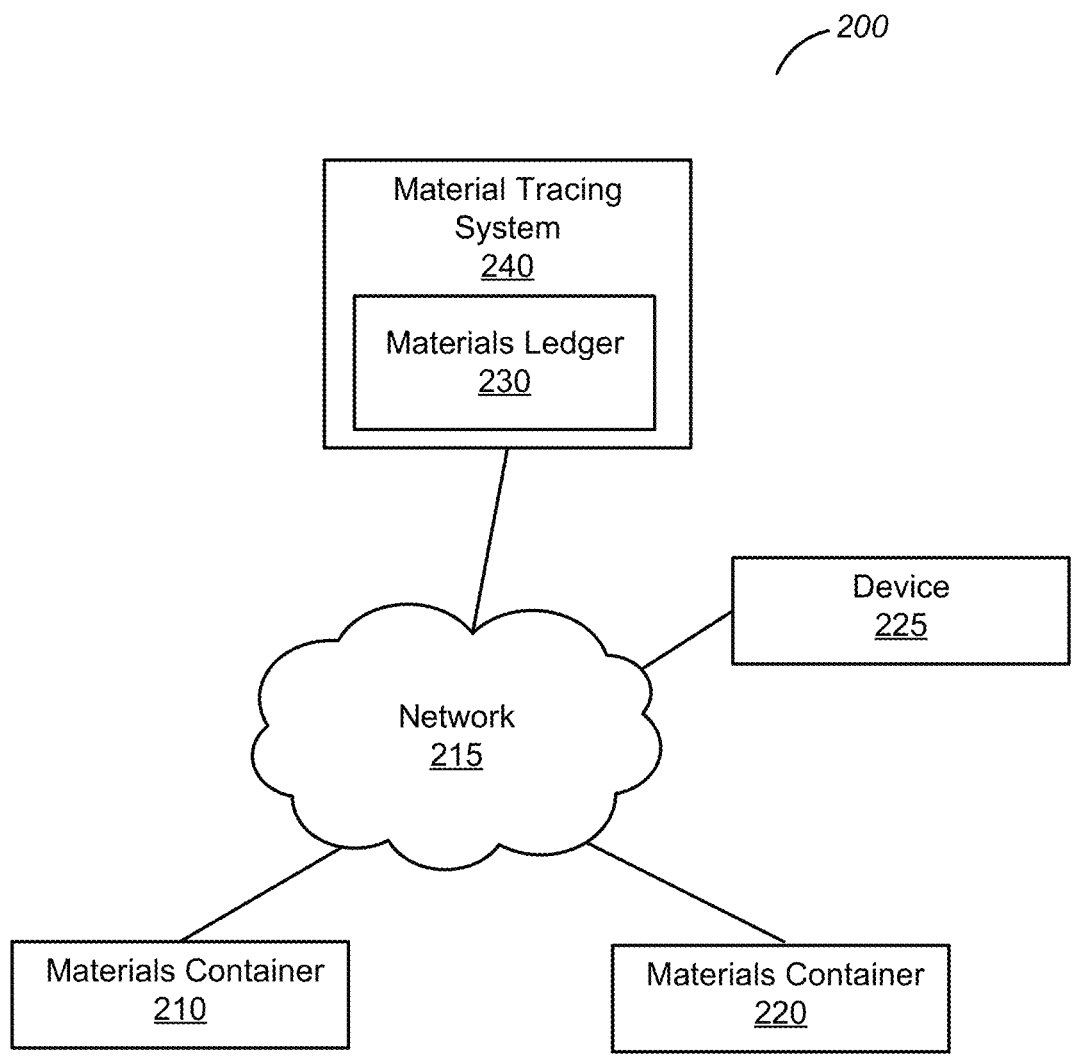
FIG. 2 illustrates one embodiment of an environment of a material tracing system for tracing and analyzing materials that do not have unique identifiers, in accordance with some embodiments of this disclosure.

FIG. 2 illustrates one embodiment of an environment 200 of a material tracing system 240 for tracing and analyzing materials that do not have unique identifiers. FIG. 2 includes materials container 210 and materials container 220. Each of materials container 210 and materials container 220 may be any materials container that is able to generate data related to the contents of the container (e.g., amount of material in the container, status of various outlet and inlet devices coupled with the container, etc.) and transmit that data out. For example, each materials container in FIG. 2 may be an instance of materials container 102, materials container 110, materials container 120, or another suitable materials container. Each materials container of FIG. 2 may transmit sensor readings through network 215 to material tracing system 240.

Network 215 may be any suitable network. For example, network 215 may be a local area network, a wide area network or a combination of the two. In some embodiments, network 215 may include the Internet. Network 215 may be a wireless network, a wired network, or a combination of the two. For example, each of materials container 210 and materials container 220 may include a wireless transceiver that enables each materials container to transmit and receive data. In some embodiments, each of materials container 210 and materials container 220 may be connected to network 215 with a wire.

The data may be received by any device connected to network 215. The devices 225 are computing devices such as smart phones, laptop computers, desktop computers, servers, routers, gateways, or any other device that may communicate with material tracing system 240 via network 110. The devices 225 may provide a number of applications, which may require user authentication before a user may use the applications, and the devices 225 may interact with material tracing system 240 100 via an application. Though one device 225 is shown in FIG. 2, any number of devices 225 may be connected to material tracing system 240 in other embodiments.

Material tracing system 240 may be a server or another suitable computing device and may be connected to network 215 wirelessly or with a wire. In some embodiments, material tracing system 240 may be connected to network 215 via one or more intermediary devices, which may be computing devices, controllers, or other systems. Material tracing system 240 may include materials ledger 230. Materials ledger 230 is an electronic ledger that stores data in a way that enables a system (e.g., material tracing system 240) to retrieve the data and perform analysis on the data. The materials ledger may include functionality that can ensure that the data has not been tampered with between the time the data was stored on the electronic ledger and the time that the data was retrieved. One example of such an electronic ledger is a blockchain. A blockchain enables tamper-proof storage of data by using an electronic system of storage blocks. Each storage block stores information about a transaction (e.g., movement of equipment, material, etc.) that is written to the blockchain. Transactions may also be referred to as transfers herein and occur at valves or conveyors. The transaction may include a date the sensors captured the data, times the data was captured, and other contextual information about the transaction, such as what equipment was used, what materials were involved, and the like. A blockchain system may include a plurality of nodes that store the storage blocks of the blockchain and may be incorporated into or connected to the material tracing system 240. One or more of those nodes may have the ability to write new data to the blockchain while some of the nodes may only be configured to enable computing devices to read from those nodes.

In some embodiments of the current disclosure, the material tracing system 240 may write to the blockchain (e.g., in embodiments where materials ledger 230 is a blockchain) the date and time of when sensor data was recorded in addition to the sensor data itself. For example, the sensor data written to a storage block may include whether a valve is open or closed, the amount of material in a materials container, a container identifier, pressure within the materials container, volume of material within the materials container, and/or other suitable sensor data. The data may be sent to a node of the blockchain system that is enabled to write data to the blockchain (e.g., create new blocks).

In some embodiments, the data on materials ledger 230 may be encrypted (e.g., using public/private key protocols). Material tracing system 240 or another suitable device may read certain data from the blockchain and decrypt that data before performing operations on the data. Material tracing system 240 may include software components, hardware components, or a combination of both. For example, the material tracing system 240 may reside on a server or another suitable computing device (e.g., a computing device with computing device architecture discussed in FIG. 6, such as device 225). Material tracing system 240 may include various software package and modules for performing actions described below.

Figure 3:
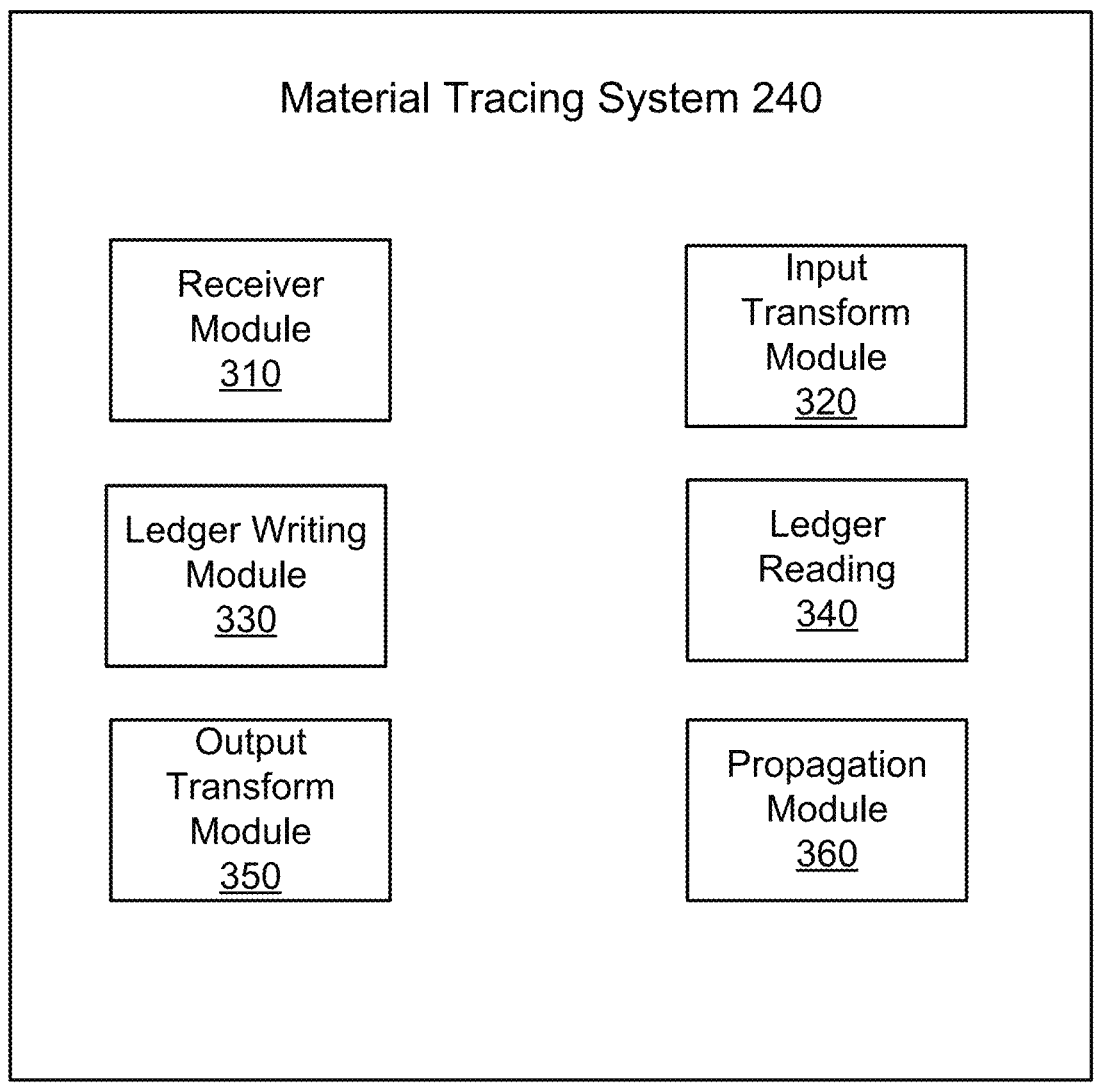
FIG. 3 illustrates modules that may be included in a material tracing system, in accordance with some embodiments of this disclosure.

FIG. 3 illustrates different modules that may be included with material tracing system 240. For instance, material tracing system 240 includes receiver module 310, input transform module 320, ledger writing module 330, ledger reading module 340, output transform module 350, and propagation module 360. In some embodiments, the material tracing system 240 may include additional or alternate modules to those shown in FIG. 3.

Receiver module 310 receives sensor readings from one or more materials containers (e.g., one or more materials containers discussed in relation with FIG. 1 and FIG. 2) via a transceiver in each materials container. That is, each materials container may include one or more sensors in one or more intake locations, one or more sensors at one or more outlet locations, and one or more sensors in internal locations. Receiver module 310 may receive the sensor readings (also referred to as sensor data) from sensors at intake locations and outlet locations of the one or more materials containers. For example, receiver module 310 may receive a status of one or more intake valves, one or more outlet valves, and a material level within each container. In some embodiments, receiver module 310 may receive the data and time of when the sensor readings were recorded. In other embodiments, receiver module 310 may assign the receiving time as the recording time of the data. Receiver module 310 may include software components, hardware components, or a combination of both. Receiver module 310 passes the received sensor readings to input transform module 320.

Input transform module 320 may detect whether material has moved based on the sensor readings received from receiver module 310. In particular, input transform module 320 may determine that material has moved based on detecting that a condition being met, detecting material flow at a conveyor, detecting a change in the balance of an account representing a materials container, or deriving material flow based on the sensor readings.

Input transform module 320 compares the received sensor readings to one or more conditions. The conditions may include whether a valve was opened or closed, whether a conveyor was turned on or off, whether power was being supplied to one or more sensors, and the like. If a condition is met, input transform module 320 may determine that material was moved. For example, receiver module 310 may determine that a valve was opened, which indicates that material moved out of the valve.

Input transform module 320 may also detect whether material moved based on sensor readings from one or more flow meters or level sensors at a materials container. For instance, if the flow meter detected a flow rate of 3 liters or more per second, input transform module 320 may determine that material was moved out of the materials container. In another example, if the level sensor detects a higher volume of material in the materials container, input transform module 320 may determine that material moved into the materials container.

Input transform module 320 may also derive that material has moved (e.g., flowed) based on the sensor readings. For instance, input transform module 320 may determine a time period when material may have flowed based on a condition being met or sensor readings from a flow meter or level sensor. Input transform module 320 matches the time period to other time periods of material flow represented in the materials ledger 230, conditions being met at one or more other materials containers, conveyors, or other equipment, or sensor readings captured at the one or more other materials containers, conveyors, or other equipment. Input transform module 320 determines valid time periods based on the matching. For example, if a time period is the same length as another time period and both time periods occurred around 6:00 PM, input transform module 320 may determine that the time periods match. Based on the matching time periods, input transform module 320 determines how much material flowed based on sensor readings captured during the time periods or by inferring an amount of material. For instance, if 10 kilograms of a material flowed out of a first materials container, which is only connected for outflow to a second materials container that does not have any sensors on it, input transform module 320 may infer that the second materials container received the 10 kilograms of material despite the lack of sensor readings from the second materials container.

Input transform module 320 transforms the received sensor data. In some embodiments, input transform module 320 may transform all sensor readings received from receiver module 310. In other embodiments, input transform module 320 may only transform sensor readings responsive to detecting that material was moved using the sensor readings, as described above. Input transform module 320 transforms the sensor readings into a format that may be written to materials ledger 230. For example, input transform module 320 may generate a package (e.g., a data structure) in a specific format to be written to materials ledger 230. The input transform module 320 may access a template for each sensor that indicates how the sensor data corresponds to particular data values (e.g., converting the electrical signals from the sensor to values representing what the sensor is measuring, such as millivolts or milliliters for a volume sensor) and extracts the data into a normalized format with the corresponding values.

The data structure may include a date and time that the sensor data was collected and the sensor data itself. Input transform module 320 may generate a package for each materials container containing all received information from that materials container for a specific time. In some embodiments, the package may include sensor readings from all materials containers within the production line for a certain time (e.g., all readings from 11:00 AM on a specific day). Input transform module 320 may pass the transformed sensor readings (e.g., the package) to ledger writing module 330. In some embodiments, input transform module 320 may generate, from the received sensor readings, an input data set corresponding to the intake components of a given materials container (e.g., sensor data from inlet valves) and an output data set corresponding to the outlet components of the given materials container (e.g., sensor data from outlet valves).

Input transform module 320 identifies sensor data that corresponds to various intake locations (e.g., sensor data from intake valves) and various outlet locations (e.g., outlet valves). For example, input transform module 320 may have access to a database that stores identifiers of various intake locations and outlet locations and a corresponding location in a production line or within a production system of materials containers. For example, for every valve, the database may include an entry indicating whether that valve is an intake valve or an outlet valve. As input transform module 320 identifies which data corresponds to inlet components and outlet components, input transform module 320 may add the data to the corresponding data set (e.g., input data set or output data set). Input transform module 320 may send the added data to ledger writing module 330.

Ledger writing module 330 may receive the transformed sensor readings and write the data to materials ledger 230. Ledger writing module 330 may be configured to work with various kinds of ledgers. For example, ledger writing module 330 may be configured to work with a particular blockchain. That is, the combination of the software and hardware of ledger writing module 330 may include code that may transmit data to a blockchain node in the appropriate format so that the blockchain node may write the data to the blockchain. In some embodiments, ledger writing module 330 may write one entry to the ledger that includes the input data set and another entry (e.g., another transaction) that includes the output data set. The combination of these entries may constitute a transaction that may be written to a separate new storage block on the blockchain together with the time that the sensor readings were taken. When the sensor data is written to materials ledger 230, that data may be read and used, for example, for determining any issues in the production process.

Figure 4A:
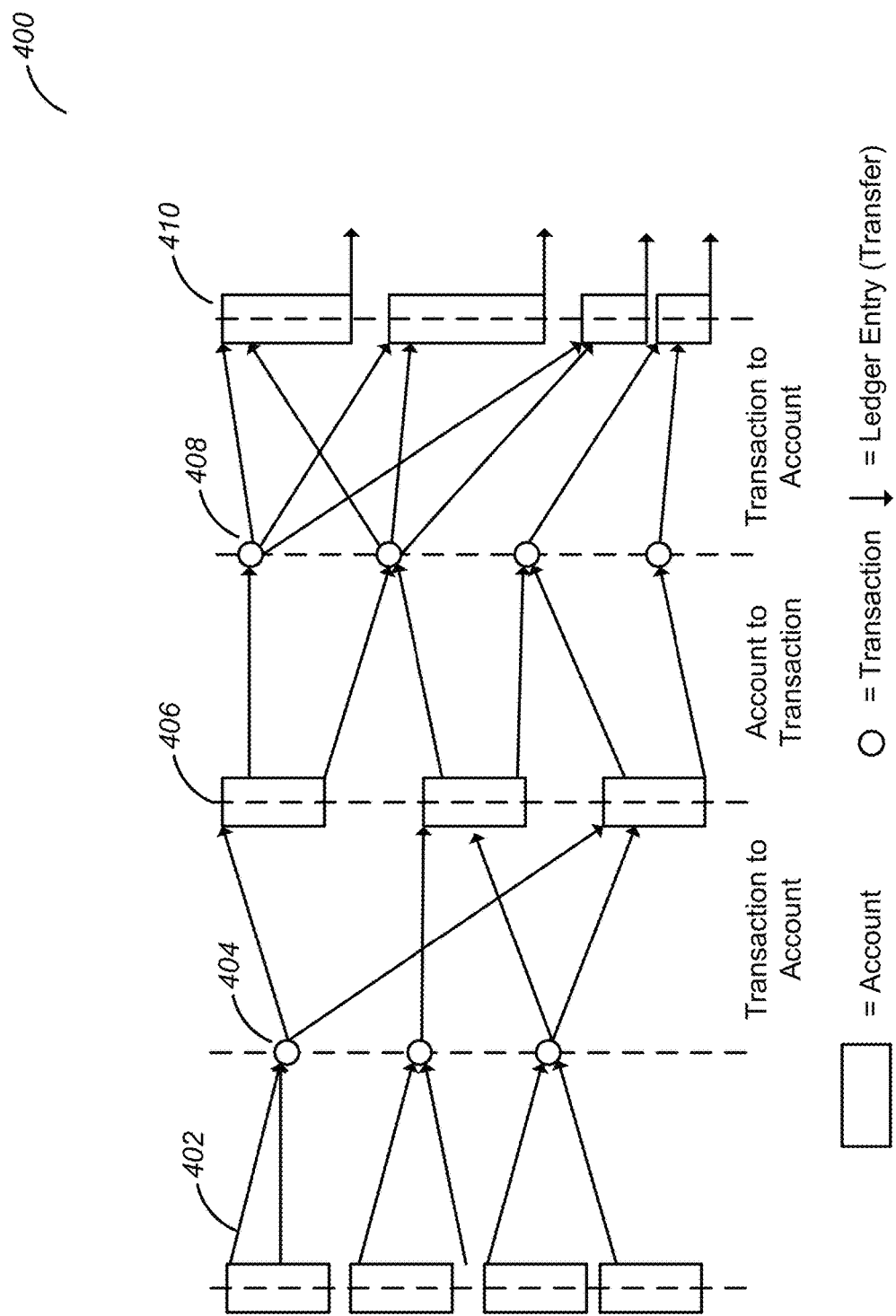
FIG. 4A illustrates relationships between accounts and transactions, in accordance with some embodiments of this disclosure.

FIG. 4A illustrates relationships 400 between accounts and transactions, according to one embodiment. Input transform module 320 may receive the sensor data for various sensors and transform the sensor data into one or more ledger entries 402 for storage in the materials ledger 230. Ledger writing module 330 may then transform the ledger entries into one or more transactions 404. Each transaction 404 may be generated when materials move out of one place (e.g., a materials container), when materials move into another place (e.g., another materials container), and/or when a checkpoint in the production process is reached (e.g., when material flows through a valve). Ledger writing module 330 may write each transaction 404 in relation to an account 406 on materials ledger 230, and ledger writing module 330 may link multiple ledger entries together for each transaction. That is, whenever a specific amount of material enters a materials container, an entry may be written to the electronic ledger for the account representing the materials container. Whenever materials leave a materials container, another transaction may be generated (e.g., transaction 408) and written to the account (e.g., of the materials container) as a ledger entry. When materials enter another materials container (e.g., at 410), another ledger entry is written but this time to the account of another materials container indicating that material has entered the container. In some embodiments, each account may represent a place where materials may be stored or moved to and from (e.g., a vehicle, a railcar, etc.).

Transactions may include a start time of when the material was moved into an account, end time when the material was moved out of the account, the amount of time that the material was in the place (e.g., the materials container), which is sometimes referred to as dwell time. In addition, other information may be stored in the transaction including amount of material that was moved via a conveyor. In some embodiments, materials ledger 230 may be customized to show material moving through equipment as last in, first out (LIFO), first in, first out (FIFO), or another suitable method that represents how equipment works. In some embodiments, input transform module 320 may generate multiple ledger entries and multiple transaction entries (e.g., an entry corresponding to the movement of material) for a single material transfer. For example, if portions of the material flow into different materials containers via different conveyers, ledger entries and transactions may be recorded for each materials container and/or conveyor.

In some embodiments, input transform module 320 may create two different types of accounts: an equipment account (e.g., for a materials container where materials are mixed) and a material batch/lot account (e.g., for a specific raw material). Each equipment account may be a permanent account, while each material batch/lot account may be a temporary account that exists, for example, only prior to the material's first use. Although equipment accounts are permanent, an equipment account may be removed when the equipment (e.g., a materials container) is removed from the system 100 (e.g., when a materials container is being decommissioned).

In some embodiments, input transform module 320 may generate one or more conveyer objects (e.g., using an initialization process) describing the movement of materials during a manufacturing process. Each conveyer object represents a vehicle for movement (e.g., a conveyor) between a source equipment (e.g., a first materials container) and a destination equipment (e.g., a second materials container). The ledger writing module 330 may store a representation of each conveyor object and data associated with the conveyor object in the materials ledger 230. Ledger writing module 330 may also generate one or more material port objects (e.g., using an initialization process), each of which may be used to describe when equipment is discharging or receiving material from a conveyer. The ledger writing module 330 may store a representation of each material port object and data associated with the material port object in the materials ledger 230.

Figure 4B:
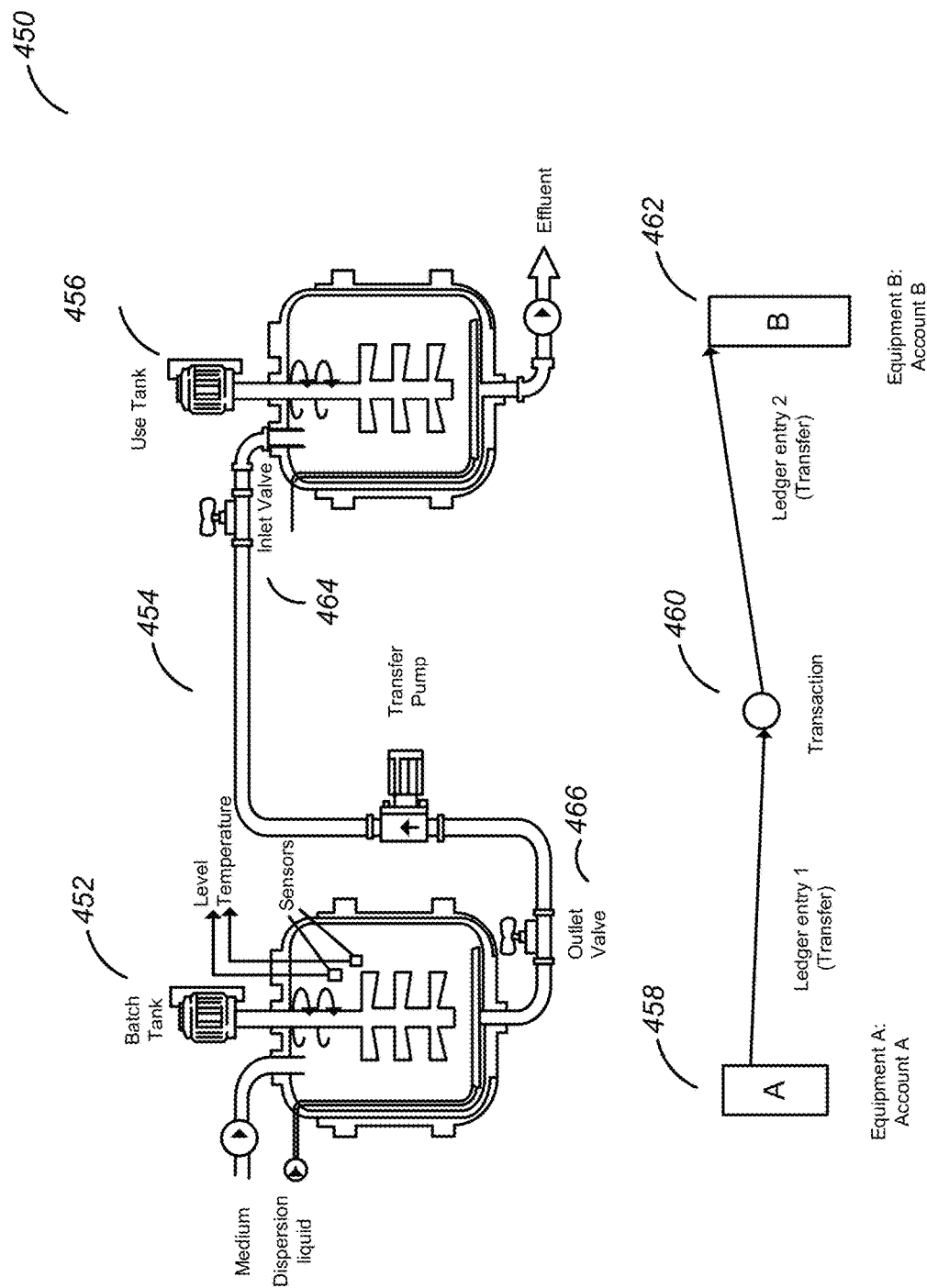
FIG. 4B illustrates how a transfer (e.g., transaction) of material between two materials containers may be recorded, in accordance with some embodiments of this disclosure.

FIG. 4B illustrates how a transfer (e.g., a transaction) of material between two materials containers may be recorded. Materials container 452 may hold a substance that may be mixed with a dispersion liquid as the substance enters materials container 452. Materials container 452 may be connected via a pipe 454 (e.g., a conveyer such as the valves described in FIG. 1) with materials container 456. Material mixed with the dispersion liquid may be moved from materials container 452 through an outlet valve 466 and into material tank 456 through an inlet valve 464. Materials container 452 may have a corresponding equipment account 458 and materials container 456 may have a corresponding account 462. Those accounts may be part of materials ledger 230. In some embodiments, pipe 454 may also have an account (e.g., a conveyer account) in materials ledger 230.

Input transform module 330 may record a transaction (e.g., transaction 460) to materials ledger 230. Transaction 460 may be a transfer from materials container 452 to materials container 456 through pipe 454. Input transform module 320 may record multiple entries into materials ledger 230 based on the transaction. For example, input transform module 320 may record a transaction into a transaction table in a database and/or a storage block onto a blockchain for each instance in time (e.g., each second) that the transaction occurs. The transaction and associated ledger entries, may include one or more parameters: an identifier of a source account (e.g., identifier of account 458), an identifier of a material port (e.g., valve) through which material left the source account, an identifier of the type of material, an amount of material that was moved (e.g., mass, volume, or another suitable kind of quantity), unit of measure (e.g., pounds), start time for material move, end time for the material move, starting balance of material in a source account (e.g., amount of material in materials container 452 when transaction started), ending balance of material in the source account (e.g., amount of material in materials container 452 when transaction started), transaction identifier, an identifier of the target account (e.g., identifier of account 462), an identifier of the port that the material entered the target account, an identifier of a conveyer account through which the material moved (e.g., identifier of an account corresponding to pipe 454), and/or other suitable parameters.

In some embodiments, input transform module 320 may add entries to the source account (e.g., account 458) and/or the target account (e.g., account 462). Each of those entries may include all or some of the parameters described above with respect to the transaction entry. Each transaction may be populated by a function and entered into a transaction table of a database. Each ledger entry for an account may be entered into an account table or into another suitable data structure within a database.

In some embodiments, as material moves from one place to another (e.g., from one materials container to another), input transform module 320 calculates transaction time of material flowing between accounts by comparing the start time and the end time of when the material has moved. Input transform module 320 may make the calculations based on the type of material (e.g., liquid, solid, gas, inferred etc.) and measurement type (e.g., mass difference, flow rate, energy over time, etc.). Ledger writing module 330 may send the calculated transaction time to ledger reading module 340 and/or add the calculated transaction time to materials ledger 230 in relation to the accounts, material, or the like.

Ledger reading module 340 is configured to read sensor data from materials ledger 230. In some embodiments, ledger reading module 340 may receive a request (e.g., based on user input) for sensor data for a specific time interval related to the ledger entries, transactions, and/or accounts. Ledger reading module 340 may determine, based on the dates in the request, which storage blocks of the ledger are required for the request. For example, material tracing system 240 may store an index that cross-references blockchain storage blocks and dates. The index may indicate a correspondence between blockchain storage blocks and sensor readings for a particular date.

Ledger reading module 340 may generate a request for the identified storage blocks and transmit the request to a node of a blockchain network hosting materials ledger 230. The node may retrieve the required storage blocks and transmit those storage blocks to a device 225 hosting ledger reading module 340. Ledger reading module 340 may receive the storage blocks and transform the data within the storage blocks into an appropriate format. For example, ledger reading module 340 may receive the sensor data as block-chain storage blocks and extract the data. Ledger reading module 340 may generate a data structure that includes the data, for example, in a time series format. In some embodiments, the sensor data on materials ledger 230 may be encrypted (e.g., with public/private key encryption). Ledger reading module 340 may decrypt the received data as part of the process. Ledger reading module 340 may then pass the data to output transform module 350.

Output transform module 350 may receive the data structure from ledger reading module 340 and output the data to one or more devices 225 connected to material tracing system 240 via network 215. In some embodiments, the output transform module 350 may output the data responsive to receiving a request from a client device (e.g., computing device such as a phone, computer, etc.) such that the client device may display the data to a user. The output transform module 350 may output a subset of the data, as requested by the client device, all data captured within a threshold amount of time, an average of the data for each sensor at set time intervals, and the like. In other embodiments, the output transform module 350 may output data to a client device with a continuous display (e.g., a computer at a warehouse). Output transform module 350 may generate, as an output 500, a time series display that includes data associated with electronic ledger entries and corresponding time. Output transform module 350 may also generate a user interface for display including the data structure, time series display, and/or any other data form materials ledger 230 for display to a user.

Figure 5:
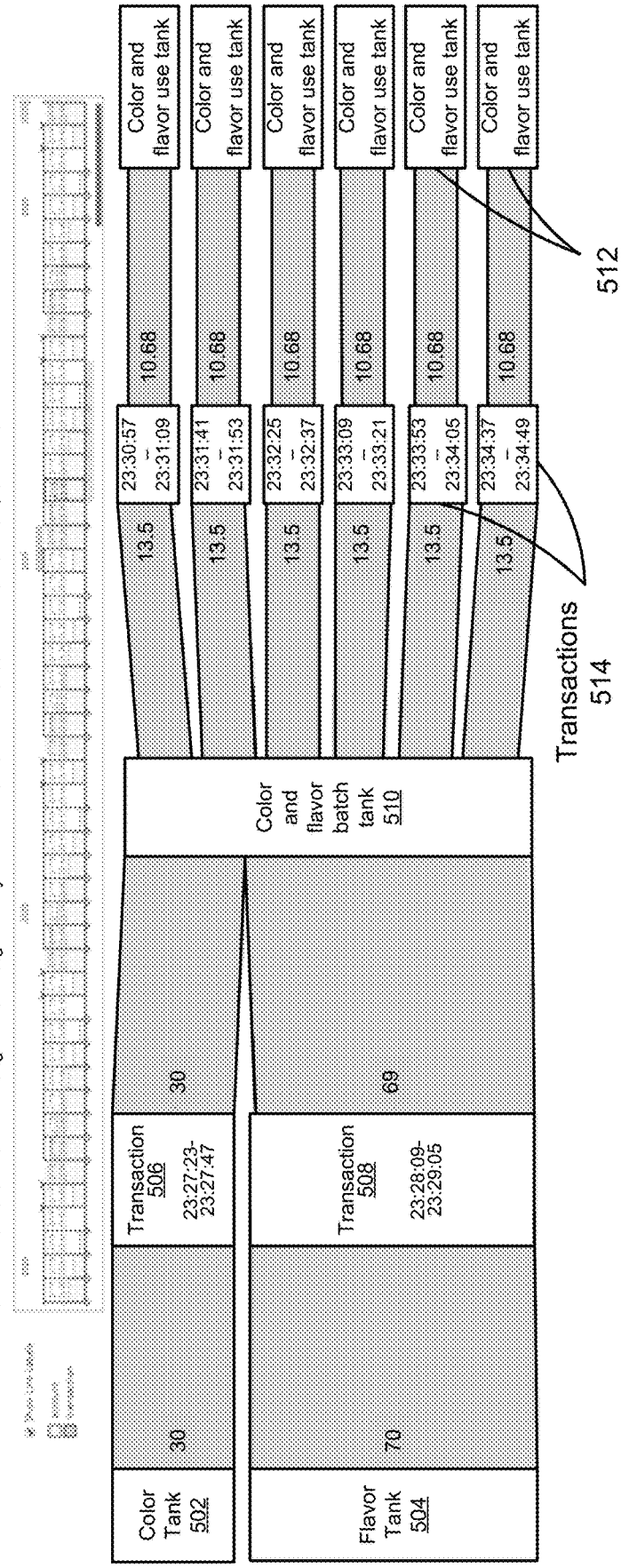
FIG. 5 illustrates an example of an output of the output transform module, in accordance with some embodiments of this disclosure.

FIG. 5 illustrates an example of an output 500 of output transform module 350. The output 500 in FIG. 5, which may be displayed via a user interface at a device 225 in a structure representing elements of the production process, illustrates a mixing process for materials including a color component and a flavor component. The color component of the final product is initially stored in color tank 502, which is a representation of a materials container, and the flavor component is initially stored in flavor tank 504, which is also a representation of a materials container. In some embodiments, the color tank 502 and flavor tank 504 may include interface elements that a user may interact with via the device 225 to see more information about the color and/or flavor component, such as composition, time of exit, date of exit, a graph representing the component exiting the materials container, and the like. The color and flavor components flow out of their respective materials containers in transaction 506 and transaction 508, respectively. Each transaction may be displayed with a time of first entry of the component (as shown in FIG. 5), time of last exit of the material (as shown in FIG. 5), a date of entry and exit, and/or interface elements that allow a user to request more data captured by sensors during the transaction. The components flow into a color and flavor batch tank 510, which is another materials container represented in the output 500. The mixture of both components flows out of color and flavor batch tank 510 into six color and flavor use tanks in transactions 514, respectively, which may each be associated with a time of entry and a time of exit of the mixture. The transactions 514 and color and flavor use tanks 512 may each be associated with a time of entry, time of exit, date, and/or other information that a user may request via one or more interface elements.

In some embodiments, material tracing system 240 may include optional propagation module 360 that tracks propagation of propagation attributes of the components (e.g., materials) passing through the materials containers, conveyors, and other equipment. A propagation attribute may indicate a quality or feature of a material and may be positive or negative in value. For example, propagation module 360 may receive sensor data from the receiver module 310 and trace contamination, sweetness, and/or another suitable propagation attribute of materials as the materials move through the production process. In this example, sweetness may be indicated by a positive value of sugar within a materials container. In another example, contamination may be indicated by any amount of glass within a component that was meant to be consumable.

Propagation module 360 may generate one or more propagation attributes based on the propagation of materials during a production process (e.g., sweetness within containers as sugar is moved through equipment) and associate the attributes with the account of the materials container where those propagation attributes originate (e.g., where the propagation attribute was detected). As material moves from account to account in the electronic ledger, propagation module 360 may generate electronic ledger entries that include values of the propagation attribute from the propagation. For example, a materials container of oats may be contaminated with wheat, which may be reflected with a propagation attribute. However, the wheat may be diluted from the oats by adding more wheat to the materials container, such that the propagation module 360 may remove the propagation attribute for the materials container once the wheat has been diluted in the oats by an amount (e.g., less than 0.01% of the materials container contains wheat).

Each propagation attribute may include one or more propagation rules for how the attribute was determined by propagation module 360 (e.g., by tracking, measuring, etc.). For example, the propagation rules may include lot tracking rules that the propagation module 360 uses to calculate various sources of the propagation attribute. Another example of a propagation rule may be a mass weighted average rule that enables calculation of a value of a propagation attribute (e.g., percentage of sugar in a mixture) or a maximum rule that enables determination of a maximum value for the propagation attribute based on the sensor data. Yet another propagation rule may be a present rule that calculates whether the propagation attribute is present within a mixture or other material. For example, the propagation module 360 may determine a Boolean indicating whether contamination or sweetness is present in a mixture based on propositional logic about the contamination or sweetness. Propagation module 360 may also use rules for stopping calculation and recording of a specific propagation attribute. For example, rules may instruct propagation module 360 to stop calculation of a propagation attribute (e.g., contamination) if, for example, the value is below a threshold value, the propagation attribute reaches a specific account or equipment, a new direct measurement (or graded sample) has been taken that overrides the value for the same propagation attribute, and/or other suitable rules.

Computing Machine Architecture

Figure 6:
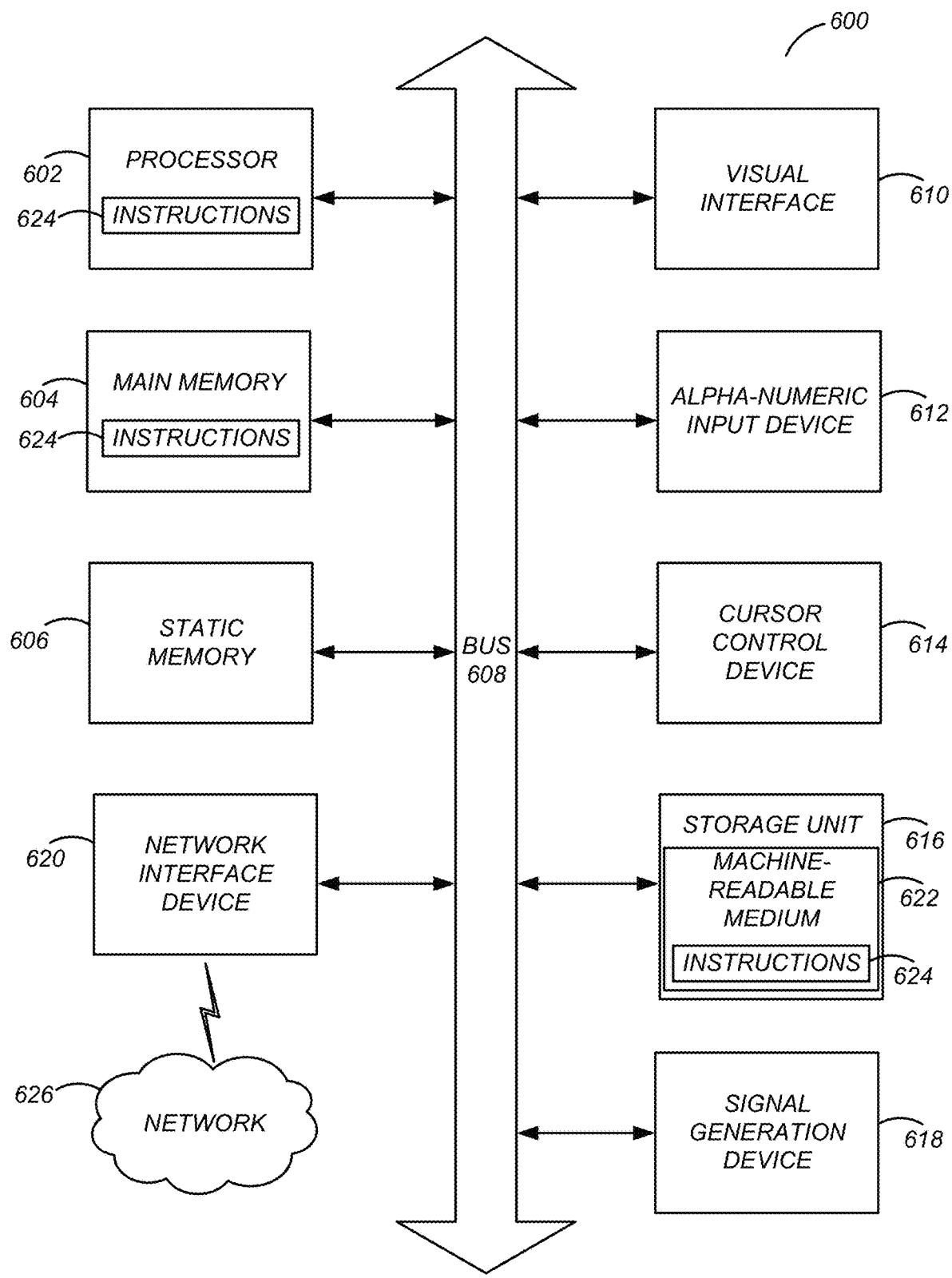
FIG. 6 is a block diagram illustrating components of an example machine able to read instructions from a machine-readable medium and execute them in a processor (or controller).

FIG. 6 is a block diagram illustrating components of an example machine able to read instructions from a machine-readable medium and execute them in a processor (or controller). Specifically, FIG. 6 shows a diagrammatic representation of a machine in the example form of a computer system 600 within which program code (e.g., software) for causing the machine to perform any one or more of the methodologies discussed herein in relation to the material tracing system 240 may be executed. The program code may be comprised of instructions 624 executable by one or more processors 602. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 624 (sequential or otherwise) that specify actions to be taken by that machine. Further, while only a single machine is illustrated, the term "machine" shall also be taken to include any collection of machines that individually or jointly execute instructions 624 to perform any one or more of the methodologies discussed herein.

The example computer system 600 includes a processor 602 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 604, and a static memory 606, which are configured to communicate with each other via a bus 608. The computer system 600 may further include visual display interface 610. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 610 may include or may interface with a touch enabled screen. The computer system 600 may also include alpha-numeric input device 612 (e.g., a keyboard or touch screen keyboard), a cursor control device 614 (e.g., a mouse, a trackball, a joystick, a motion sensor, or other pointing instrument), a storage unit 616, a signal generation device 618 (e.g., a speaker), and a network interface device 620, which also are configured to communicate via the bus 608.

The storage unit 616 includes a machine-readable medium 622 on which is stored instructions 624 (e.g., software) embodying any one or more of the methodologies or functions described herein. The instructions 624 (e.g., software) may also reside, completely or at least partially, within the main memory 604 or within the processor 602 (e.g., within a processor's cache memory) during execution thereof by the computer system 600, the main memory 604 and the processor 602 also constituting machine-readable media. The instructions 624 (e.g., software) may be transmitted or received over a network 626 via the network interface device 620.

While machine-readable medium 622 is shown in an example embodiment to be a single medium, the term "machine-readable medium" should be taken to include a single medium or multiple media (e.g., a centralized or distributed database, or associated caches and servers) able to store instructions (e.g., instructions 624). The term "machine-readable medium" shall also be taken to include any medium that is capable of storing instructions (e.g., instructions 624) for execution by the machine and that cause the machine to perform any one or more of the methodologies disclosed herein. The term "machine-readable medium" includes, but not be limited to, data repositories in the form of solid-state memories, optical media, and magnetic media.

Recordation Process

Figure 7:
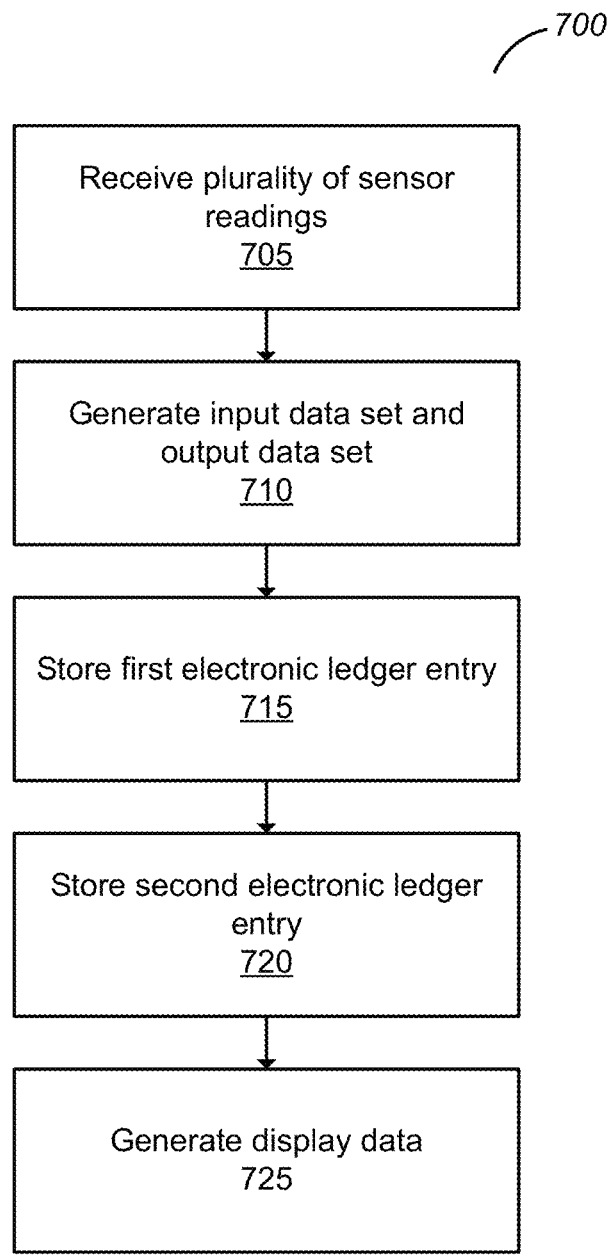
FIG. 7 illustrates a process for generating display data based on an electronic ledger, in accordance with some embodiments of this disclosure.

FIG. 7 illustrates a process 700 for generating display data based on an electronic ledger, in accordance with some embodiments of this disclosure. The material tracing system 240, as described in FIG. 3, may perform the process 700, and in some embodiments, may perform additional steps as described in relation to FIG. 3. In particular, material tracing system 240, which may be hosted at a computer system 600, receives 705, from a materials container, a plurality of sensor readings. The materials container comprises a plurality of sensors at one or more intake locations and one or more outlet locations and may include a transceiver that communicates sensor data captured at the sensors to material tracing system 240. Material tracing system 240 generates 710 an input data set of sensor readings corresponding to inflowing material and an output data set of sensors readings corresponding to outflowing material from the plurality of sensor readings. In some embodiments, material tracing system 204 may additionally transform the data in each data set into a format for recordation in materials ledger 230.

Material tracing system 240 stores 715 a first electronic ledger entry on materials ledger 230. The first electronic entry comprises the input data set and a time that sensor readings corresponding to the one or more intake locations were taken. In some embodiments, the first electronic entry may include other data, such as a date the sensor readings were taken, pressure or volume values within the materials container. Material tracing system 240 stores 720 a second electronic ledger entry on materials ledger 230. The second electronic entry comprises the output data set and a time that sensor readings corresponding to the one or more outlet locations were taken. Material tracing system 230 generates 725 display data associate with the first and second electronic ledger entries and transmits the display data to one or more client devices for display. For example, in some embodiments, the display data may be a graph similar to the graph of FIG. 5.

It is appreciated that although FIG. 7 illustrates a number of interactions according to one embodiment, the precise interactions and/or order of interactions may vary in different embodiments. For example, in some embodiments, material tracing system 240 may receive a request for more data related to the materials container from a device 225 via network 215. Material tracing system 240 may access materials ledger 230 to retrieve and transform the requested data and send the data for display via a user interface at the device 225. In another instance, the request may indicate a desire for real-time data from the materials container. Material tracing system 240 may request real-time sensor data from the sensors at the materials container and send the real-time sensor data for display to the device 225. Further, material tracing system 240 may receive requests for data stored for specific times and may access materials ledger 230 to retrieve and display such data.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for tracing and analyzing materials without unique identifiers through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for tracking material flow, the method comprising:
   providing a plurality of sensors;
   receiving, from a materials container, a plurality of sensor readings from the plurality of sensors, the plurality of sensors comprising one or more sensors at one or more intake locations of the materials container and one or more sensors at two or more outlet locations of the materials container;
   generating, from the plurality of sensor readings, an input data set and an output data set, the output data set distinguishing sensor readings for material that left the materials container from different outlets of the materials container by distinguishing different readings at the two or more outlet locations of the materials container, each different reading from one of the two or more outlet locations of the materials container, the material lacking a trackable identifier and including combined components that together form the material;
   storing a first electronic ledger entry on an electronic materials ledger, wherein the first electronic ledger entry comprises the input data set and a time that each sensor reading corresponding to the one or more intake locations was taken;
   storing a second electronic ledger entry on the electronic materials ledger, wherein the second electronic ledger entry comprises the output data set and a time that each sensor reading corresponding to the two or more outlet locations was taken, the sensor readings corresponding to the two or more outlet locations indicating two or more attributes of individual ones of the combined components that are not perceptible to the human eye; and
   generating for display a visual representation of data associated with the first electronic ledger entry and data associated with the second electronic ledger entry, the visual representation showing a divergence of the material that left the materials container from the different outlets to different downstream locations.

2. The method of claim 1, wherein generating, from the sensor readings, the input data set and the output data set comprises:
   identifying one or more sensors at the one or more intake locations and one or more sensors at the one or more outlet locations;
   adding data associated with the one or more sensors at the one or more intake locations to the input data set; and
   adding data associated with the one or more sensors at the one or more outlet locations to the output data set.

3. The method of claim 1, further comprising:
   transmitting a request to the electronic materials ledger for one or more electronic ledger entries, wherein the request comprises a time interval; and
   receiving, in response to the request, a plurality of electronic ledger entries, wherein the plurality of electronic ledger entries comprises the first electronic ledger entry and the second electronic ledger entry.

4. The method of claim 3, wherein generating for display the first electronic ledger entry and the second electronic ledger entry comprises generating a time series display comprising data associated with the plurality of electronic ledger entries and corresponding time, wherein the time series display comprises the data associated with the first electronic ledger entry and the data associated with the second electronic ledger entry.

5. The method of claim 1, wherein the electronic materials ledger is a blockchain.

6. The method of claim 1, wherein the electronic materials ledger is a database system of ledger entries.

7. The method of claim 1, further comprising:
   determining one or more propagation attributes of a material in the materials container based one or more propagation rules.

8. The method of claim 1, further comprising:
   matching the second electronic ledger entry to one or more other electronic ledger entries to determine an amount of material that entered a second materials container after exiting the materials container.

9. The method of claim 1, wherein generating, from the plurality of sensor readings, the input data set and the output data set comprises:
   generating a first package for the materials container containing sensor data received at the intake locations of the materials container at a specific time, wherein the first package is a data structure that is formatted based on the electronic materials ledger; and
   generating a second package for the materials container containing sensor data received at the outlet locations of the materials container at the specific time, wherein the second package is a data structure that is formatted based on the electronic materials ledger.

10. A computer system comprising:
    a plurality of sensors;
    a computer processor; and
    a non-transitory computer-readable storage medium storage instructions that when executed by the computer processor perform actions comprising:
      receiving, from a materials container, a plurality of sensor readings from the plurality of sensors, the plurality of sensors comprising one or more sensors at one or more intake locations of the materials container and one or more sensors at two or more outlet locations of the materials container;
      generating, from the plurality of sensor readings, an input data set and an output data set, the output data set distinguishing sensor readings for material that left the materials container from different outlets of the materials container by distinguishing different readings at the two or more outlet locations of the materials container, each different reading from one of the two or more outlet locations of the materials container, the material lacking a trackable identifier and including combined components that together form the material;
      storing a first electronic ledger entry on an electronic materials ledger, wherein the first electronic ledger entry comprises the input data set and a time that each sensor reading corresponding to the one or more intake locations were taken;

storing a second electronic ledger entry on the electronic materials ledger, wherein the second electronic ledger entry comprises the output data set and a time that each sensor reading corresponding to the two or more outlet locations was taken, the sensor readings corresponding to the two or more outlet locations indicating two or more attributes of individual ones of the combined components that are not perceptible to the human eye; and generating for display a visual representation of data associated with the first electronic ledger entry and data associated with the second electronic ledger entry, the visual representation showing a divergence of the material that left the materials container from the different outlets to different downstream locations.

11. The computer system of claim 10, wherein the actions for generating, from the sensor readings, the input data set and the output data set comprise:

identifying one or more sensors at the one or more intake locations and one or more sensors at the one or more outlet locations;

adding data associated with the one or more sensors at the one or more intake locations to the input data set; and adding data associated with the one or more sensors at the one or more outlet locations to the output data set.

12. The computer system of claim 10, the actions further comprising:

transmitting a request to the electronic materials ledger for one or more electronic ledger entries, wherein the request comprises a time interval; and receiving, in response to the request, a plurality of electronic ledger entries, wherein the plurality of electronic ledger entries comprises the first electronic ledger entry and the second electronic ledger entry.

13. The computer system of claim 12, wherein the actions for generating for display the first electronic ledger entry and the second electronic ledger entry comprises generating a time series display comprising data associated with the plurality of electronic ledger entries and corresponding time, wherein the time series display comprises the data associated with the first electronic ledger entry and the data associated with the second electronic ledger entry.

* * * * *